July 16, 1963
B. S. CALVERT
3,097,659
WATER TANK PRESSURIZING SYSTEM
Filed May 8, 1961
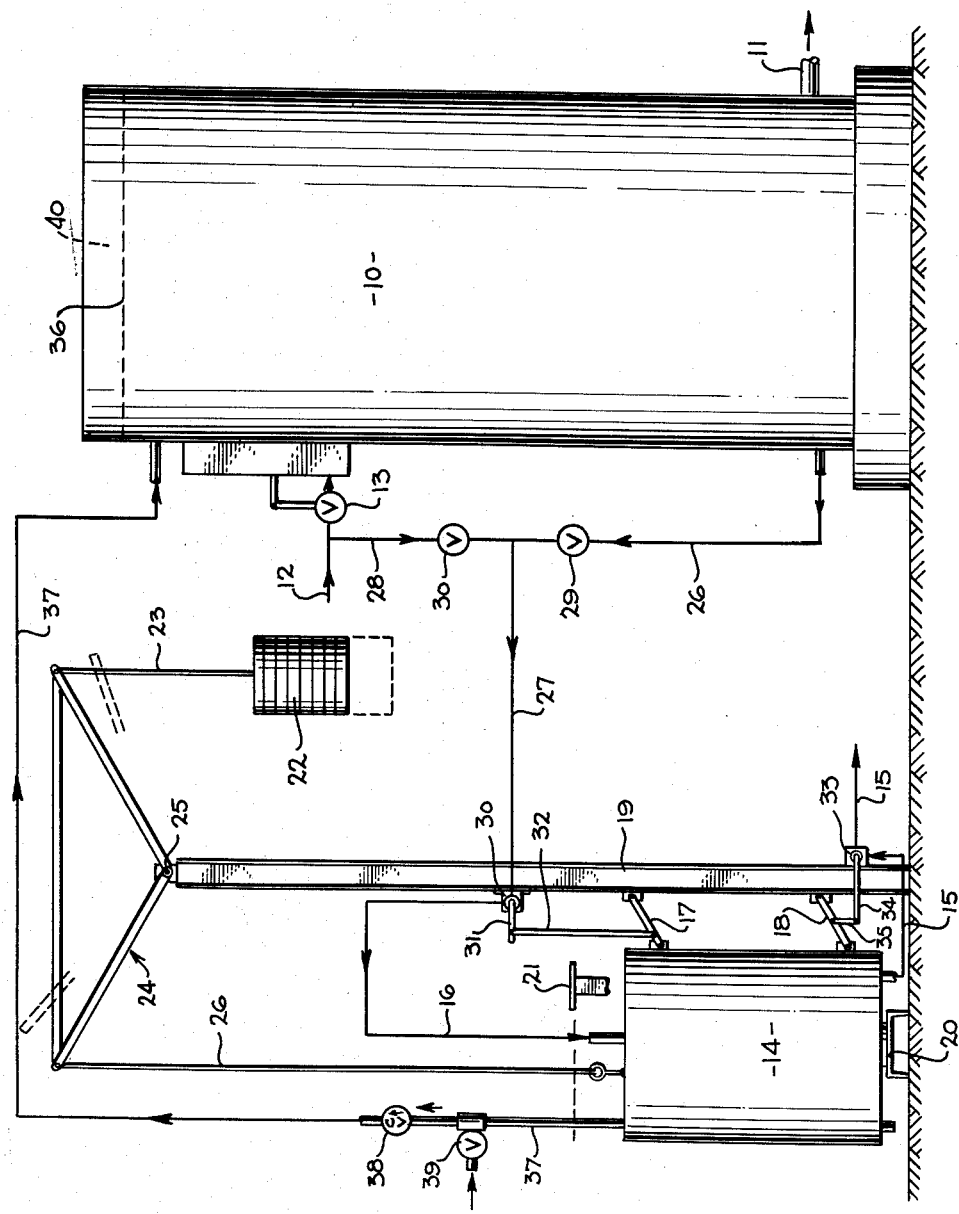
INVENTOR.
BERT S. CALVERT
BY
ATTORNEYS United States Patent Office 3,097,659
Patented July 16, 1963

3,097,659
WATER TANK PRESSURIZING SYSTEM
Bert S. Calvert, Rte. 8, Box 317, Tucson, Ariz.
Filed May 8, 1961, Ser. No. 108,334
3 Claims. (Cl. 137—209)

This invention relates generally to improved systems for pneumatically pressurizing liquid-containing tanks, and is directed particularly to a simple, economical and fully practical system for pressurizing water tanks usable for any of various purposes including industrial, domestic and agricultural water supply.

As is generally known, water may be supplied out of tanks from which gravity flow cannot be taken in the absence of adequate hydraulic head of the tank water in relation to the place of use. In such instances it has been customary to pneumatically pressurize the tank as by a compressor so controlled in its operation as to maintain air under pressure above the water level in the tank. Obviously, the cost, maintenance and operation of the compressor are expense items which desirably could be avoided. Another practice employed in the absence of a compressor, has been to pump the water into an empty tank to a level at which air in the top of the tank becomes compressed to a desirable degree and which is thereafter relied upon to pressurize water withdrawal from the tank. However, in the course of time, the air thus trapped dissolves in the water and eventually becomes depleted to the extent of requiring replacement which is effected by draining and refilling the tank in the manner stated. This practice is disadvantageous in that repressurizing may entail the waste of a considerable quantity of water.

The invention has for its primary object to provide a simple pressurizing system operable automatically in response to intermittent water delivery and slow rate water bleed-off, to intermittently air pressurize the main water tank. As will appear, the pressurizing components of the system may be reduced to a simple, relatively small gravity-actuated container mounted for vertical movements in response to introduction of water to the container and restricted water bleed-off therefrom, all in a manner such that water introduction to the chamber produces a pumping effect which displaces air under pressure from the container to the main water tank.

Structurally, the invention contemplates mounting a relatively small closed container for counterbalanced vertical movement, providing the chamber with a pressurized water inlet line and with an air outlet connection with the main tank, the container also having a checked inlet through which air may be taken into the container as water is withdrawn therefrom. Such withdrawal occurs through a restricted outlet or bleed line, the size of which may be governed in accordance with the desired frequency of air chargings into the main tank.

The system performs simply and continuously over long periods without requiring servicing, in that its operation depends merely upon intermittent vertical cycling of the container and the operation of water and air control valves responsive to such circulation. Thus, when water is bled out of the container to a certain extent, counterweight elevation of the container opens a valve in the water inlet line and simultaneously opens the second valve in the air connection between the container and tank so that the inflow of pressurized water acts to displace air from the container into the tank wherein air remains compressed above the water level. Thereafter, the accumulated weight of the container causes the latter to lower, shutting off the water intake and air discharge control valves. The container water thereafter is slowly released, causing atmospheric air to be drawn in the tank until the container water is depleted to initiate again the cycle described.

All the features and objects of the invention, as well as the details of a typical embodiment will be more fully understood from the following detailed description of the accompanying drawing diagrammatically illustrative of the invention in close sheet form:

The main closed water tank 10 is shown to have a service supply outlet 11 and a pressurized water inlet 12 through which water enters the tank past the conventionally illustrated liquid level control valve 13.

A relatively small auxiliary closed tank or vessel 14 is suitably mounted for up and down movements in response to withdrawal and entry of water repectively through the bottom bleed line 15 and water delivery line 16. Typically, the container 14 may be so mounted by parallel linkage connections 17 and 18 with a support or column 19 so that the container is laterally stabilized in its movements between the illustrated down position of engagement with a lower stop 20 and an uppermost position of engagement against stop 21. The container is counterweighted as by suitable mass 22 suspended by member 23 from a triangular oscillating beam structure 24 pivoted at 25 on the support 19 and connected to the container 14 through suspension member or line 26. Upon introduction of a predetermined quantity of water to the vessel, the latter overcomes the weight of countermass 22 and assumes the illustrated down position. When a predetermined quantity of water is bled from the tank through line 15, the countermass elevates the tank to a position determined by the stop 21.

Pressurized water is delivered to container 14 either from tank 10 through lines 26 and 27, or directly from line 12 by way of line 28, the choice being determinable by setting of the manual valves 29 and 30. Water delivery from line 27 through line 16 to the container 14 is controlled by a valve 30 operated by way of arm 31 and link 32 connecting with link 17. Using a very small bleed line 15, such for example as ⅛ inch tubing leading from an approximately five gallon vessel 14, the water release from the container through the line may be constantly maintained, or if desired, the water bleed may be discontinued while the container is in its up position. For such control, the bleed may occur past valve 33 connected by arm 34 and link 35 with the link 18.

Air is displaceable from the container 14 into tank 10 either below or above its water level 36 by way of flexible line 37 which contains a check valve 38 preventing return flow of water or air from the tank to the vessel. The latter is provided with a suitable checked air inlet such as check valve 39 which admits air through line 37 into the vessel 14 during water withdrawal therefrom, and closes to confine air escape passage through line 37 to the tank 10 while water is being introduced to the vessel.

In considering the operation of the system, wherein the vessel 14 is shown to be positioned below the tank 10, or below the liquid water level therein, assume first the vessel to be in its down position with valve 30 closed and valve 33 open to permit constant restricted bleed of water from the container. Upon withdrawal of a predetermined quantity of water, which may approach emptying of the vessel, the latter is elevated by the counterweight 22, closing valve 33 and opening valve 30 to recharge the vessel with water. During the in-flow, air is displaced by the water through line 37, ultimately to compressed condition within space 40 in tank 10 above the water level. As the vessel weight overcomes the weight of the countermass 22, the vessel lowers to its down position, closing valve 30 and opening valve 33 to continue the water bleed-off. As previously indicated, water being withdrawn from the vessel is replaced by a successive charge of air entering past the check valve 39.

The drawing is to be regarded merely as illustrative of the invention in a typical form and arrangement, it being understood that various changes and modifications may

I claim:
1. A liquid tank pressurizing system, comprising a main closed tank containing liquid and an air space above the liquid, a relatively small pressurizing vessel, means mounting said vessel for counterbalanced up and down movements in a range of travel below the liquid level in the tank and in response to introduction to and removal of liquid from the vessel, a return line receiving liquid from a lower elevation region of the tank for delivering to said vessel liquid which is pressurized by the air in said tank space and by the weight of the tank liquid above said lower elevation region, said tank having a liquid inlet and also a liquid supply outlet which is at a lower elevation, a conduit through which air is displaced from said vessel into the tank as liquid is delivered into the vessel, a valve-controlled air inlet for the vessel, means for bleeding liquid from the vessel, and means for alternately opening and closing liquid delivery through said line to said vessel in response to said movements of the vessel.

2. The invention as defined in claim 1 including a liquid supply conduit communicating with said return line through a junction and also with said tank, and independently operable valve in said liquid supply conduit and in said return line between said junction and tank.

3. The invention as defined in claim 1 in which said mounting means comprises an upright member, vertically spaced parallel links on said member and mounting said vessel to move up and down while remaining vertically oriented at the side of said upright support, a counterweight and a pivotal support on said member and interconnecting said vessel and counterweight independently of said links, said means for opening and closing liquid delivery including a valve in said return line which opens in response to upward link and vessel movement to allow liquid delivery to said vessel in an up position and which closes in response to downward link and vessel movement.

References Cited in the file of this patent
UNITED STATES PATENTS

| | | |
|---|---|---|
| 270,944 | Fox | Jan. 23, 1883 |
| 903,420 | Themke | Nov. 10, 1908 |
| 1,425,813 | Underwood | Aug. 15, 1922 |
| 2,450,781 | Carlson | Oct. 5, 1948 |
| 2,752,087 | Wallace | June 26, 1956 |